UNITED STATES PATENT OFFICE.

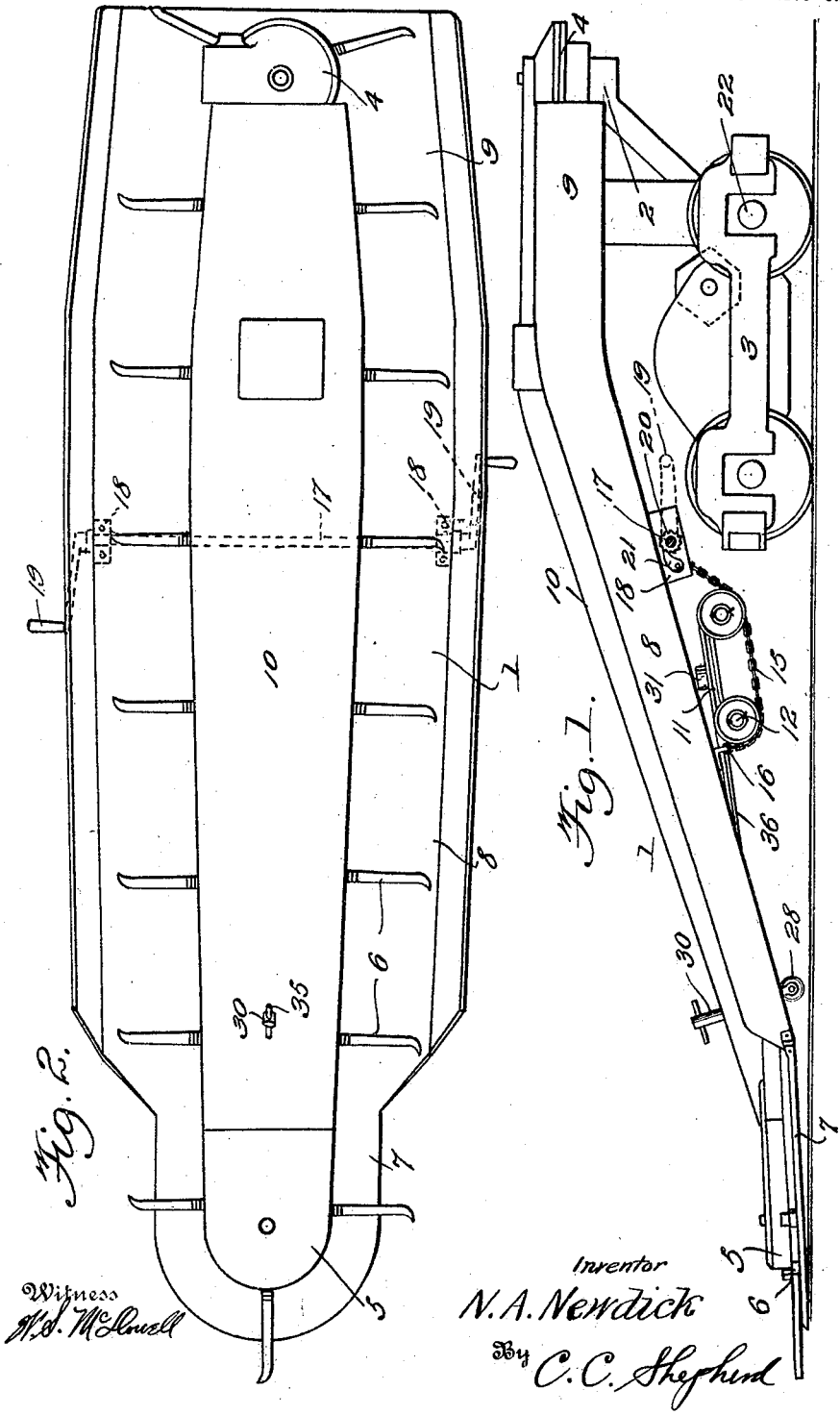

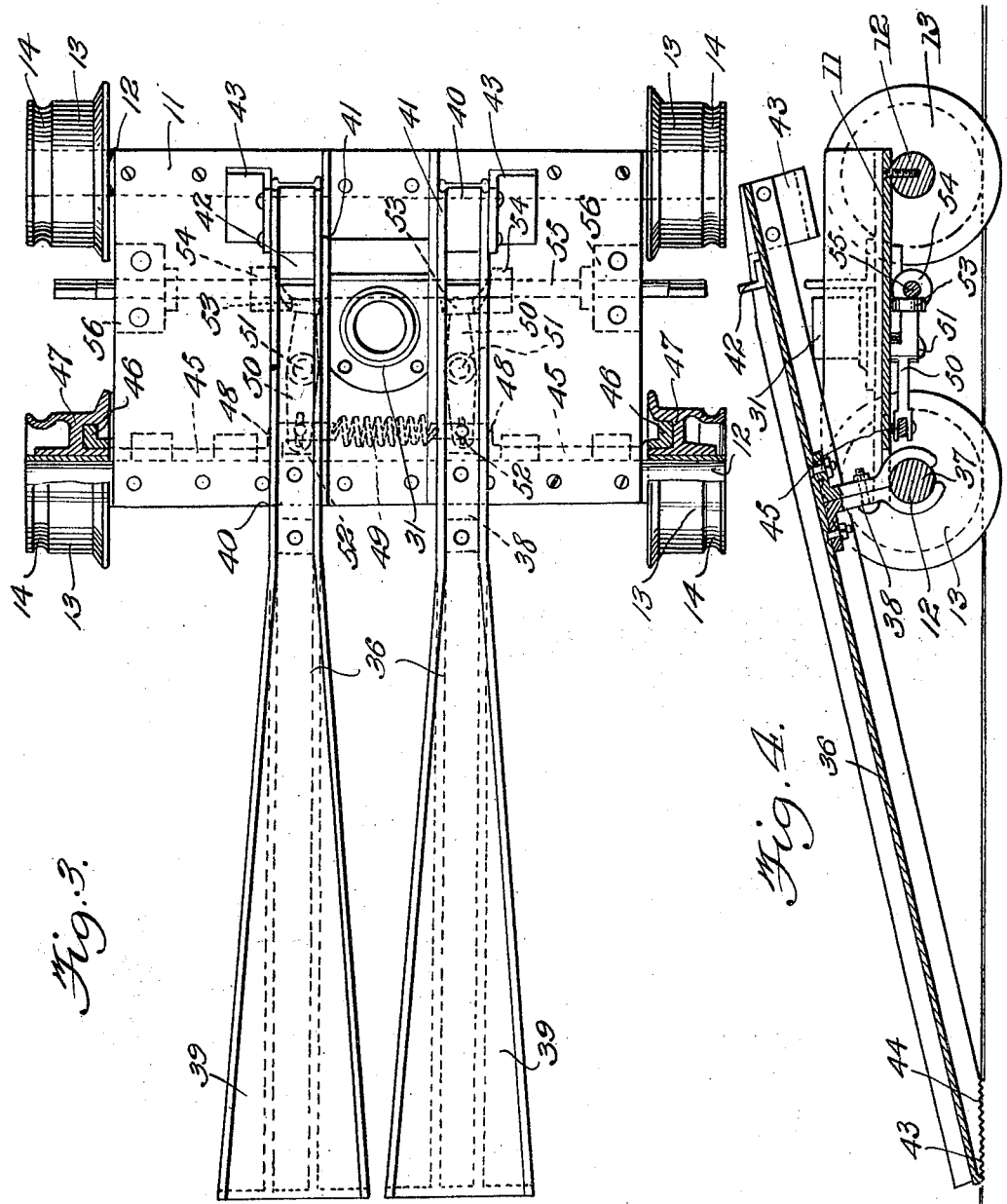

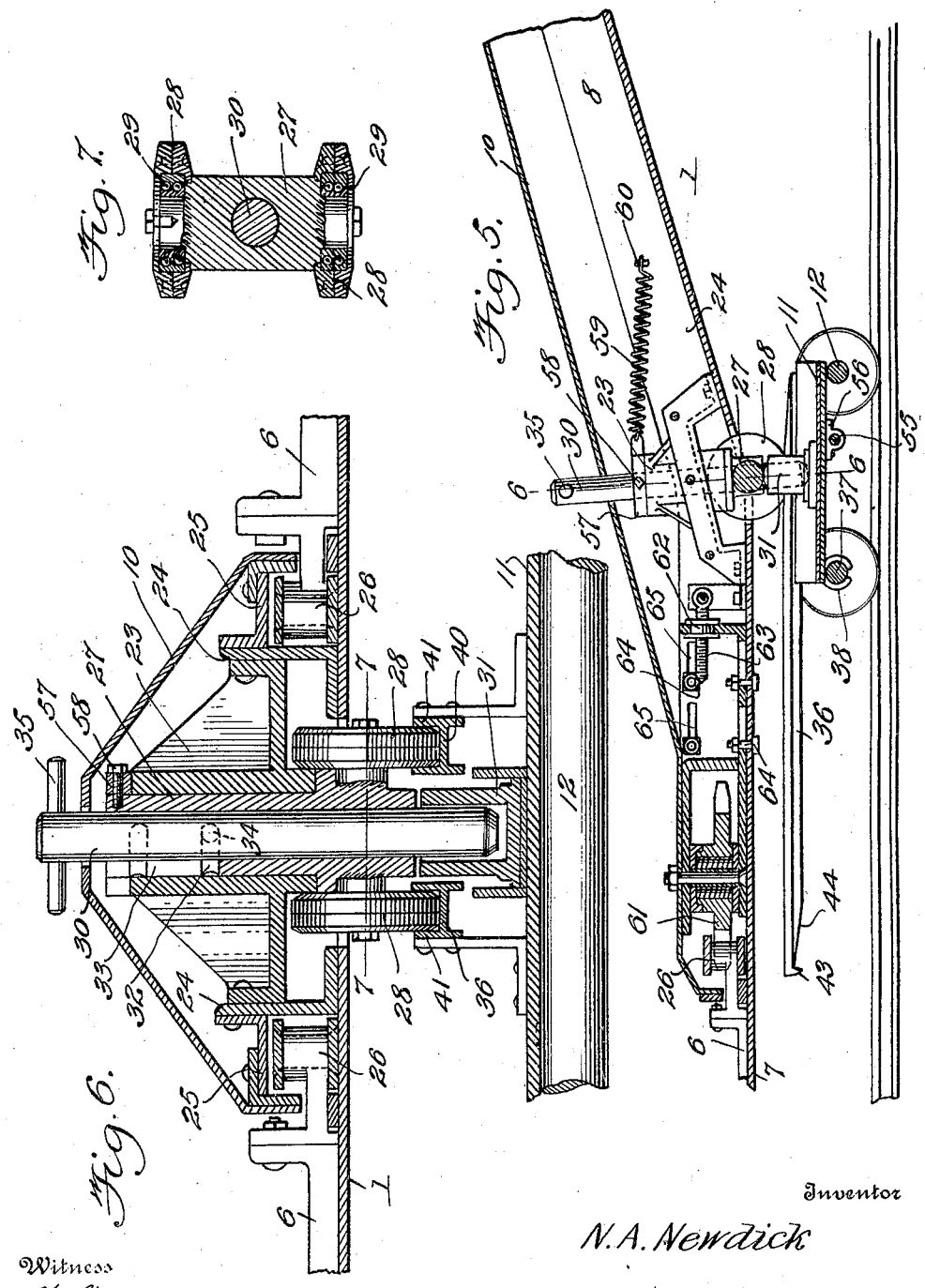

NORTON A. NEWDICK, OF COLUMBUS, OHIO, ASSIGNOR TO JAMES ELLWOOD JONES, OF SWITCHBACK, WEST VIRGINIA.

COAL-LOADING MACHINE.

1,413,128.	Specification of Letters Patent.	Patented Apr. 18, 1922.

Application filed August 24, 1918. Serial No. 251,330.

*To all whom it may concern:*

Be it known that NORTON A. NEWDICK, a citizen of the United States, residing at Columbus, in the county of Franklin and State of Ohio, has invented certain new and useful Improvements in Coal-Loading Machines, of which the following is a specification.

This invention relates to mining machines and is particularly directed to a pony truck adapted for use in connection with the front end of a loading machine which is itself mounted at its opposite end to permit of a sweep movement across the mine chamber while the truck itself is designed to perform the function of supporting the front end of the loading machine in transporting it from one position to another within the mine itself.

One of the main objects of my invention resides in a structure whereby the pony truck may be supported by the loading machine in an inoperative position to permit of the sweep movement of the loading machine without any interference whatever from the pony truck. This is of advantage in that the pony truck may be mounted in an inoperative position upon the loading machine and at a point adjacent or directly above the mine tracks to be ready for quick use whenever desired. Also, this arrangement avoids the unnecessary labor of moving the truck to one side of the mine chamber when not in use and again returning it when desiring its use.

A further object of this invention resides in the structure whereby the front end of the loading machine is coupled to the truck to give it an articulated movement when passing around curves. Associated with this is also a novel structure whereby the front end of the loading machine may be readily and conveniently guided into its proper position upon the truck when such movement is desired.

Still another object of the present invention resides in means for resisting the rearward movement of the truck upon its rails when the front end of the loading machine is being moved rearwardly to cause it to assume a position upon the truck. As shown in the drawings, this resisting effort may be accomplished by braking the wheels or it may be accomplished by means of the skid structure or a combination of wheels.

The preferred embodiment of my invention is shown in the accompanying sheets of drawings in which similar characters of reference denote corresponding parts and in which;

Figure 1 is a view in side elevation of a type of loading machine capable of a sweep movement at its front end and showing the pony truck in inoperative position, Figure 2 is a top plan view of the structure shown in Figure 1, Figure 3 is a top plan view of the pony truck shown separately and on an enlarged scale, Figure 4 is a longitudinal sectional view taken through one of the skids of the structure as shown in Figure 3, Figure 5 is a central longitudinal sectional view of the lower front end of the loading machine showing the pony truck in its supporting position, Figure 6 is a transverse vertical section taken on line 6—6 of Figure 5, and Figure 7 is a horizontal section taken on line 7—7 of Figure 6.

In Figures 1 and 2, the loading machine is designated in its entirety by the reference numeral 1 and is shown as being pivotally mounted at 2 upon a supporting wheeled truck 3. The essential elements of this loading machine are the head and tail sprockets 4 and 5 over which a chain passes carrying flights shown at 6. The conveyor pan is located on both the going and return sides of the chain and is formed with a depressed lower end 7, downwardly inclined intermediate portion 8 and the rear flat portion 9, the flights 6 operating in this pan and the chain and other operative structure for the flights being combined within the housing structure shown at 10.

The pony truck itself is shown separately in Figures 3 and 4 and comprises a bed plate 11, a pair of axles 12 secured thereto and flanged wheels 13. The other edges of each of these wheels are grooved as shown at 14 to co-operate with the chains shown at 15 in Figure 1. These chains are secured at one end as shown at 16 to the intermediate portion 8 of the loading machine and their opposite ends are secured to a windlass structure in the nature of a shaft 17 operating in bearings 18 and preferably operated manually by means of cranks 19. One of the other ends of this shaft 17 is also provided with a ratchet wheel 20 operating in conjunction with the pawl 21.

Should it be desired to use the loading machine for the purpose of loading coal, the same is given a sweep movement across the mine floor after the flights 6 have been set in operation. It is at this time that it is necessary that the pony truck should be in a noninterfering position and to accomplish this, it is proposed to move it to the position shown in Figure 1 by causing the chains 15 to seat themselves in the wheel grooves 14 and then operating the windlass structure 17 whereby the chains 15 are wound thereon and the pony truck drawn clear of the tracks or floor thereby permitting the sweep movement of the loader.

From Figure 1, it will be observed that the rear end of the loading machine is pivotally mounted in a horizontal direction about the rear axle 22 by means of the vertical pivot casting 2. The front end of this loading machine must necessarily then be supported in some other manner than upon the mine floor when moving from chamber to chamber. To this end, the pony truck has been supplied and in order to permit of an articulated movement, the following structure has been devised, a bearing member 23 has been provided and located near the lower front end of the machine, and as shown in Figure 6 is secured to the frame members 24 which, with the structures shown at 25 forms the guideways within which the chain 26 carrying the flights 6 operates. This bearing member 23 is in turn provided with a sleeve 27 upon which a pair of caster wheels 28 are rotatably mounted as shown for instance in Figure 7 by means of the anti-friction bearings 29. These caster wheels 28 are spaced apart to some extent to prevent a sidewise rocking motion when in their applied position upon the truck and in order to securely couple the loader to the truck, a king bolt 30 is provided which fits within the sleeve 27 and seats in a socket bearing casting 31 rigidly secured upon the truck itself as shown. This arrangement then prevents the accidental separation of the loading machine and the truck when being moved about the mine and in order to prevent the king bolt 30 from being jarred out of position, the sleeve portion 27 is provided with a bayonet slot, the horizontal portion of which is shown at 32 and the vertical portion at 33. The king bolt is provided with a lateral pin 34 which operates in this bayonet slot and, after applying the king bolt, it is given a quarter turn by grasping the handle 35 whereupon the pin seats itself in the horizontal portion 32 to prevent its accidental removal.

The truck itself is provided with a pair of skids 36 which are pivotally mounted intermediate their ends in connection with the front axle 37 of the pony truck by means of the structure shown at 38. These skids are flared at their forward ends as shown at 39 while their rear ends 40 are of a size to comfortably fit the caster wheels 28 and the skids themselves are provided with vertical flanges 41 to serve as guides for the casters or rollers 28. In loading the machine upon the truck, the truck is dropped to an operative position upon the tracks whereupon the skids 36 assume the position shown in Figure 4. Rearward movement of the loading machine then causes the casters or rollers 28 to ride the skids and be properly guided thereby. After these rollers move beyond the center of the axle 37, the skids are automatically moved to a horizontal position because of the weight of the loader as is indicated in Figure 5. The skids themselves are provided with a stop 42 to prevent the rollers from moving beyond the rear end of the truck and the skids are further provided with limiting buffers 43 which engage the bed plate 11 of the truck to insure the skids assuming a horizontal position. After this operation, the king bolt is applied and the structure is ready for transportation about the mine.

In loading the machine upon the pony truck as just described, difficulty is sometimes encountered because of the rearward sliding of the truck upon the tracks simultaneously with the rearward movement of the loader. To overcome this, I have provided the front ends of the skids 36 with a plurality of teeth, those marked 43 being along the front edges thereof and those indicated at 44 being along the cut edge of the depending legs of the skids. The weight of the machine will force these teeth into engagement with the floor or cause them to catch upon the ties and in this manner will assist in holding the truck in stationary position as the loader is moved rearwardly. Should this not be sufficient, however, I have provided an additional structure for braking certain of the wheels. Referring particularly to Figure 3, a pair of bars 45 are shown whose ends 46 are turned up as shown to form brake shoes to engage the webs 47 of the truck wheels 14. The inner ends of these bars are offset slightly as shown at 48 and are apertured to be connected by means of a tension spring 49. This tension spring operates to normally pull the bars and their brake shoes out of engagement with the webs 47 and these brake shoes are forced into braking engagement with their webs by means of the following mechanism. Levers 50 are provided and are pivotally mounted to the bed plate 11 intermediate their ends as shown at 51 and are provided with a slotted connection with their respective bars as shown at 52. The opposite ends of these levers carry rollers 53 which ride upon the faces of the cams shown at 54. These cams are in turn rigidly mounted upon a shaft 55 which is suitably journaled in bearings 56 and whose ends are squared to be engaged by a suitable operating tool or wrench. Thus, when the shaft 55 is rotated, the humps of the cams 54 operating in connection with the rollers 53 on the levers 51 will in turn force the brake shoes into holding relation with the truck wheel webs 47. In this manner, the truck may be readily held in position and in addition, if it is found desirable, this braking mechanism may be used to supplement the action of the teeth 43 and 44.

In rounding the curve when the front end of the loader is upon the truck it is essential that the caster wheels turn slightly in their bearings to permit of an articulated movement. To insure their automatic return to proper position after the curve has been rounded, or during the completion of the rounding of the curve, I have provided the sleeve 27 which carries the rollers 28 with a collar 57 rigidly held in connection with the sleeve by means of the set screw shown at 58. To this collar, and at a point some considerable distance from the sleeve 27, I attach a collar tension spring 59 rigidly secured at its other end to the loader frame work as shown at 60. This spring will then operate to maintain the caster wheels in their central position although their deflection is permitted and made possible by the tensioning of the spring 59.

From the foregoing description, taken in connection with the accompanying sheets of drawings, it will be apparent that I have provided a structure possessing various utilitarian features. Among these is the structure for coupling the loader and truck together, the structure for permitting the proper operation of the skids 36, the braking mechanism, the centering of the casters by means of the spring 59, the structure for moving the truck out of interfering position, etc. When the loader is moved into its proper position in the mine chamber, the front end of the loader is removed from the pony truck by first removing the king bolt 30. The braking mechanism is then rendered effective by rotating the shaft 55 to bring the humps of the cams 54 into proper engagement with the levers 50 so that the brake shoes 46 are moved into engagement with the wheel webs 47. Thus the truck may be held in stationary position when the loader is advanced a distance sufficient to permit the casters to ride upon the skids 36. As soon as these rollers move beyond the front axle 12 of the truck, the skid pivots about the axle 12 and tilts downwardly thus permitting the complete removal of the loader. The truck is then moved rearwardly on the track and the chains 15 brought into engagement with the grooved portions 14 of the wheels 13, it being understood that these wheels 13 are of a width considerably greater than the track upon which they ride so that they project beyond this track to permit the ready application of the chain. The shaft 17 is again manually operated and the truck drawn up to the position shown in Figure 1 which is a non-interfering position to permit the sweep movement of the loader. The flights 6 carried by the chain 26 are then set in motion by a suitable motor and driving mechanism usually carried by the truck 3, not shown in the present drawings. This chain is of endless form, the tail sprocket around which it passes being shown at 61 in Figure 5. This tail sprocket is also shown as being adjustable by means of a take up structure in case the chain should wear which take up structure is operated by rotating the threaded collar or nut 62 operating in conjunction with the screw 63. All of the remaining connections of the take up designated generally by the reference numeral 64 is effected through its slotted connections 65 with the loader frame. After the loader has performed its functions and it is desired to remove the same to another chamber, the process described when removing the loader from the truck is reversed. In other words, the pony truck is lowered upon the tracks and moved into position beneath the front end of the loader. The brake mechanism may be set and rearward movement of the loader brings the teeth 43 and 44 into holding engagement with the ground. Continued rearward movement will in time cause the skids to assume the positions shown in Figure 5 and the king bolt 30 will then be inserted and locked in position.

What is claimed as new and patentable is:

1. The combination with a downwardly inclined loading machine capable of a sweep movement, of a pony truck, end means for engaging the wheels of said truck for drawing it up adjacent the under side of the inclined portion of said machine out of interfering position to permit it a sweep movement.

2. The combination with a downwardly inclined loading machine capable of a sweep movement, of a wheeled pony truck, the wheels of said truck being grooved, chains secured at one end to said machine and adapted to seat in said grooves, and means operating in connection with the other ends of said chains for shortening the effective length of the chains for drawing said truck up adjacent the underside of the inclined portion of said machine out of interfering position to permit it a sweep movement.

3. The combination with a downwardly inclined loading machine capable of a sweep movement, of a wheeled pony truck, the wheels of said truck being grooved, chains secured at one end to said machine and adapted to seat in said grooves, and a manually operated windlass structure for the other end of said chains for drawing the truck up adjacent the inclined portion of said machine out of interfering position to permit it a sweep movement.

4. In a loading machine, a gathering mechanism mounted at its rear end to permit a sweep movement, a pony truck for the front end of said mechanism, a caster wheel structure carried by said mechanism and pivotally mounted in connection therewith, means co-operating with said structure for guiding said mechanism onto said truck and spring means operatively engaging said structure to normally hold it in centered position.

5. In a loading machine, a gathering mechanism mounted at its rear end to permit a sweep movement, a pony truck for the front end of said mechanism, a caster wheel structure carried by said mechanism, means co-operating with said structure for guiding said mechanism onto said truck, a bearing member carried by said mechanism, a sleeve carried by said structure and fitting within said member, spring means operatively engaging said sleeve to normally hold said structure centered, a bearing member on said truck, a king bolt passing through said sleeve and adapted to enter said truck bearing member, and means for locking said king bolt in its applied position.

6. In a loading machine, gathering mechanism mounted at its rear end to permit a sweep movement, a pony truck for the front end of said mechanism, a skid structure pivotally mounted intermediate its ends adjacent the front of said truck, means on the front of said mechanism for co-operation with said skid, and means carried by said skid structure for resisting its rearward sliding during the loading of said mechanism thereon.

7. In a loading machine, gathering mechanism mounted at its rear end to permit a sweep movement, a pony truck for the front end of said mechanism, a skid structure pivotally mounted intermediate its ends adjacent the front of said truck, means on the front of said mechanism for co-operation with said skid, and a plurality of teeth carried by said skid structure for engaging the floor for resisting rearward movement of the truck during the loading of said mechanism thereon.

In testimony whereof I affix my signature.

NORTON A. NEWDICK.